US008581957B2

(12) United States Patent
Bengtsson et al.

(10) Patent No.: US 8,581,957 B2
(45) Date of Patent: Nov. 12, 2013

(54) VIDEO CONFERENCE USING AN EXTERNAL VIDEO STREAM

(75) Inventors: Henrik Bengtsson, Lund (SE); Erik Johan Vendel Backlund, Gantofta (SE); Jari Aarni Sassi, Lund (SE); Johan Apelqvist, Hjarup (SE); David Per Burstrom, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1242 days.

(21) Appl. No.: 11/971,493

(22) Filed: Jan. 9, 2008

(65) Prior Publication Data

US 2009/0174763 A1 Jul. 9, 2009

(51) Int. Cl.
*H04N 7/14* (2006.01)
*G06F 15/16* (2006.01)

(52) U.S. Cl.
USPC .................................. 348/14.08; 709/204

(58) Field of Classification Search
USPC ........... 348/14.08; 455/550.1, 556.1; 709/204
See application file for complete search history.

(56) References Cited

U.S. PATENT DOCUMENTS

| 7,130,184 | B2 * | 10/2006 | Choi ......................... 361/679.23 |
| 7,133,062 | B2 * | 11/2006 | Castles et al. .............. 348/14.03 |
| 2004/0080624 | A1 | 4/2004 | Yuen |
| 2005/0021620 | A1 * | 1/2005 | Simon et al. .................. 709/204 |
| 2007/0047479 | A1 * | 3/2007 | Shaffer et al. ................. 370/328 |

FOREIGN PATENT DOCUMENTS

| EP | 1 503 588 A1 | 2/2005 |
| EP | 1659794 A1 * | 5/2006 |
| WO | WO 2006/046051 | 5/2006 |

OTHER PUBLICATIONS

Notification of Transmittal of the International Search Report and the Written Opinion of the International Searching Authority, or the Declaration, corresponding to PCT/IB2008/052745, Mar. 25, 2009, 12 pages.

\* cited by examiner

*Primary Examiner* — Curtis Kuntz
*Assistant Examiner* — Sunita Joshi
(74) *Attorney, Agent, or Firm* — Sreenivas Vedantam; Moore & Van Allen PLLC

(57) ABSTRACT

A portable communication device may determine whether a video camera is in a vicinity of the portable communication device. If so, video taken by the video camera may be used in a video conference conducted from the portable communication device.

23 Claims, 11 Drawing Sheets

VIDEO CONFERENCE USING AN EXTERNAL VIDEO STREAM

BACKGROUND

The proliferation of portable communication devices, such as mobile phones, has grown tremendously within the past decade. In addition to voice conversations, portable communication devices offer a number of additional features to their users, such as text messaging, multimedia playback, and video conferencing.

When conducting a video conferencing using a portable communication device, the portable device may be used to send/receive a video stream (i.e., both audio and image information) with another party. The portable communication device may include a camera or video camera that is used to obtain the images for the video stream. The user may need to hold the portable device in an orientation that points the camera of the portable communication device at the user. In this manner, the portable communication device may enable a video conference. Participating in a video conference by holding the portable device in an orientation that allows the device to focus on the user, however, can be awkward and may not be generally conducive to a good user experience.

SUMMARY

According to one aspect, a method may include determining, by a portable communication device, whether at least one video camera external to the portable communication device is in a vicinity of the portable communication device; and using video taken by the at least one video camera in a video conference conducted via the portable communication device.

The method may further include presenting a list of video cameras that are determined to be in the vicinity of the portable communication device to a user of the portable communication device.

The determining in the method may further include obtaining a location of the portable communication device; and identifying the video cameras in the vicinity of the portable communication device based on the location information. Additionally, obtaining the location of the portable communication device may include obtaining the location using a GPS signal.

The determining in the method may further include determining the video cameras in a vicinity of the portable communication device based on face recognition techniques used to recognize a user of the portable communication device in video taken by the video cameras The determining in the method may further include determining video cameras in the vicinity of the portable communication device based on presence information that is wirelessly transmitted by the video cameras.

Further, the video cameras external to the portable communication device may include public surveillance cameras.

Further, the method may include using the video taken by the at least one video camera in a video conference by: receiving the video from the at least one video camera at the portable communication device; and transmitting the received video to a party with whom the video conference is to be conducted.

Further, in the method, using the video taken by the at least one video camera in a video conference, may further include causing the video from the at least one video camera to be transmitted to a party with whom the video conference is to be conducted.

Another aspect is directed to a method that may include receiving, at a portable communication device, a request for video cameras that are external to the portable communication device; identifying, by the portable communication device, video cameras that are external to the portable communication device and that are in a vicinity of the portable communication device; and presenting, via a visual display on the portable communication device, the identified video cameras.

Further, in the method, the identifying may further include obtaining a location of the portable communication device; and determining the video cameras in the vicinity of the portable communication device based on the location.

Further, in the method, the identifying may further include determining the video cameras in the vicinity of the portable communication device based on face recognition techniques used to recognize the user in video taken by the video cameras.

Further, in the method, the identifying may further include determining the video cameras in the vicinity of the portable communication device based on presence information that is wirelessly transmitted by the video cameras.

Further, the method may further include enabling a video conference in which video of a user of the portable communication device corresponds to video taken by one of the video cameras external to the portable communication device and in which audio input to the portable communication device corresponds to audio recorded by the portable communication device.

Further, the method may further include presenting a graphical interface configured to facilitate selection of one of the identified video cameras for use in a video conference.

Another aspect is directed to a portable communication device. The portable communication device may include a memory to store instructions and a processor to execute the instructions. The device may determine whether video cameras external to the portable communication device are in a vicinity of the portable communication device and enable a video conference in which video taken by at least one of the determined video cameras is used as a video source for the video conference.

The portable communication device may further include a display, wherein the processor further executes instructions to present a list of the video cameras determined to be in the vicinity of the portable communication device to the user of the portable communication device.

Further, the processor of the portable communication may further execute instructions to obtain a location of the portable communication device and determine the video cameras in a vicinity of the portable communication device based on the location.

Further, the processor of the portable communication device may further execute instructions to obtain the location of the portable communication device by obtaining the location using a GPS signal.

Further, the processor of the portable communication device may further execute instructions to determine the video cameras in a vicinity of the portable communication device based on face recognition techniques used to recognize a user of the portable communication device in video taken by the video cameras.

Further, the processor of the portable communication device may further execute instructions to determine the video cameras in a vicinity of the portable communication device based on presence information that is wirelessly transmitted by the video cameras.

Further, the video cameras external to the portable communication device may include public surveillance cameras.

Another aspect is directed to a computer-readable medium containing instructions executable by at least one processor. The computer-readable medium includes instructions to determine, by a portable communication device, whether a first video camera external to the portable communication device is in a vicinity of the portable communication device; and instructions to conduct a video conference using video taken by the first video camera.

Another aspect is directed to a device that may comprise means for identifying, by a portable communication device, whether video cameras external to the portable communication device are in a vicinity of the portable communication device; and means for conducting a video conference from the portable communication device using video taken by at least one of the identified video cameras.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention.

Overview

Surveillance cameras for law enforcement or other agencies can be prevalent in certain areas. Consistent with aspects described herein, a portable communication device may determine whether an external camera, such as a surveillance camera, is currently viewing the user of the portable communication device. The image or video feed from the external camera may be used as the image/video source for a video conference.

Exemplary System Configuration

Figure 1:
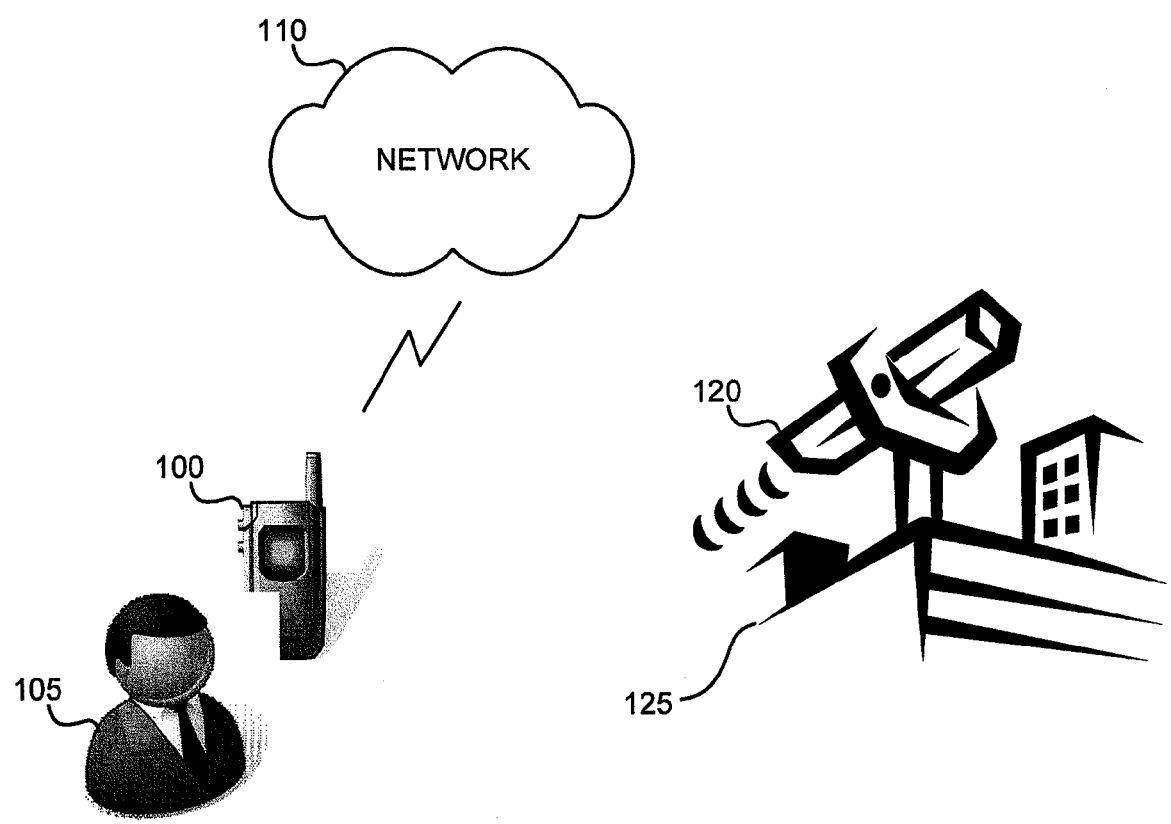
FIG. 1 is an exemplary diagram of an environment or system in which concepts described herein may be implemented.

FIG. 1 is an exemplary diagram of an environment or system in which concepts described herein may be implemented. The environment may include a portable communication device 100 that may be carried by a user 105. Portable communication device 100 may be a portable device such as a cellular phone, a personal digital assistant (PDA), a laptop, or another type of computation or communication device, a thread or process running on one of these devices, and/or an object executable by one of these devices. Portable communication device 100 may be a device that provides connectivity to network 110. For example, portable communication device 100 may connect wirelessly to network 110 to communicate voice, video, and/or data through network 110.

Network 110 may include a local area network (LAN), a wide area network (WAN), a metropolitan area network (MAN), a telephone network, such as the Public Switched Telephone Network (PSTN) or a cellular telephone network, an intranet, the Internet, or a combination of networks. User 105 of portable communication device 100 may connect to network 110 via wired, wireless, and/or optical connections. Although shown as a single network 110, network 110 may represent a number of different types of networks. For example, when device 100 is a cellular phone with web browsing capabilities, network 110 may represent a traditional cellular network through which a user may place wireless calls and a data network, such as the Internet, over which the user may browse various web pages.

Assume that the environment shown in FIG. 1 includes a camera 120 mounted on a structure 125. Camera 120 may be a public surveillance camera (e.g., a camera operated by police or other law enforcement personnel), a private camera, or any other type of camera. Structure 125 may be any structure, such as a building or utility pole, appropriate for mounting camera 120.

In general, in some locations, cameras 120 are commonly used by governments and/or businesses to reduce crime and maintain order. In some metropolitan areas, security cameras are so prevalent that an average citizen may be filmed numerous times each day. Security cameras can also provide a sense of security for citizens. Thus, it is reasonable to assume that the coverage of security cameras will continue to increase.

Exemplary Device

Figure 2:
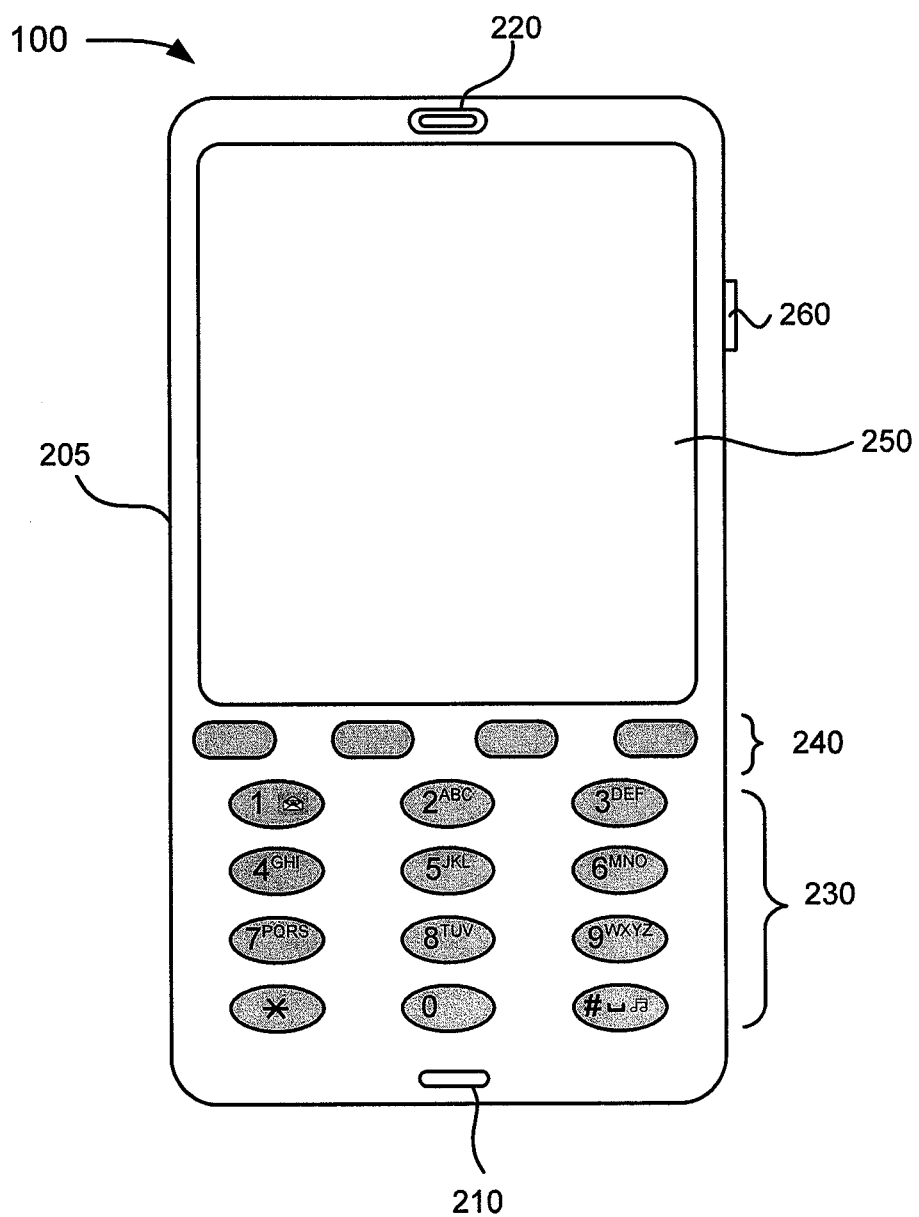
FIG. 2 is a diagram illustrating a front view of exemplary external components of a portable communication device.

FIG. 2 is a diagram illustrating a front view of exemplary external components of portable communication device 100. As illustrated, device 100 may include a housing 205, a microphone 210, a speaker 220, a keypad 230, function keys 240, a display 250, and a camera/video activation button 260.

Housing 205 may include a structure configured to contain components of device 100. For example, housing 205 may be formed from plastic and may be configured to support microphone 210, speaker 220, keypad 230, function keys 240, display 250, and camera/video activation button 260.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound wave. For example, a user may listen to music through speaker 220.

Keypad 230 may include any component capable of providing input to device 100. Keypad 230 may include a standard telephone keypad. Keypad 230 may also include one or more special purpose keys. In one implementation, each key of keypad 230 may be, for example, a pushbutton. A user may utilize keypad 230 for entering information, such as text or a phone number, or activating a special function.

Function keys 240 may include any component capable of providing input to device 100. Function keys 240 may include a key that permits a user to cause device 100 to perform one or more operations. The functionality associated with a key of function keys 240 may change depending on the mode of device 100. For example, function keys 240 may perform a variety of operations, such as placing a telephone call, playing various media, setting various camera features (e.g., focus, zoom, etc.) or accessing an application. Function keys 240 may include a key that provides a cursor function and a select function. In one implementation, each key of function keys 240 may be, for example, a pushbutton.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may display, for example, text, image, and/or video information. Display 250 may also operate as a view finder.

Camera/video activation button 260 may be a pushbutton that enables a user to initiate taking an image or to initiate taking a series of images (i.e., video). Camera/video activation button 260 may activate a camera located at, for example, the back of device 100.

Figure 3:
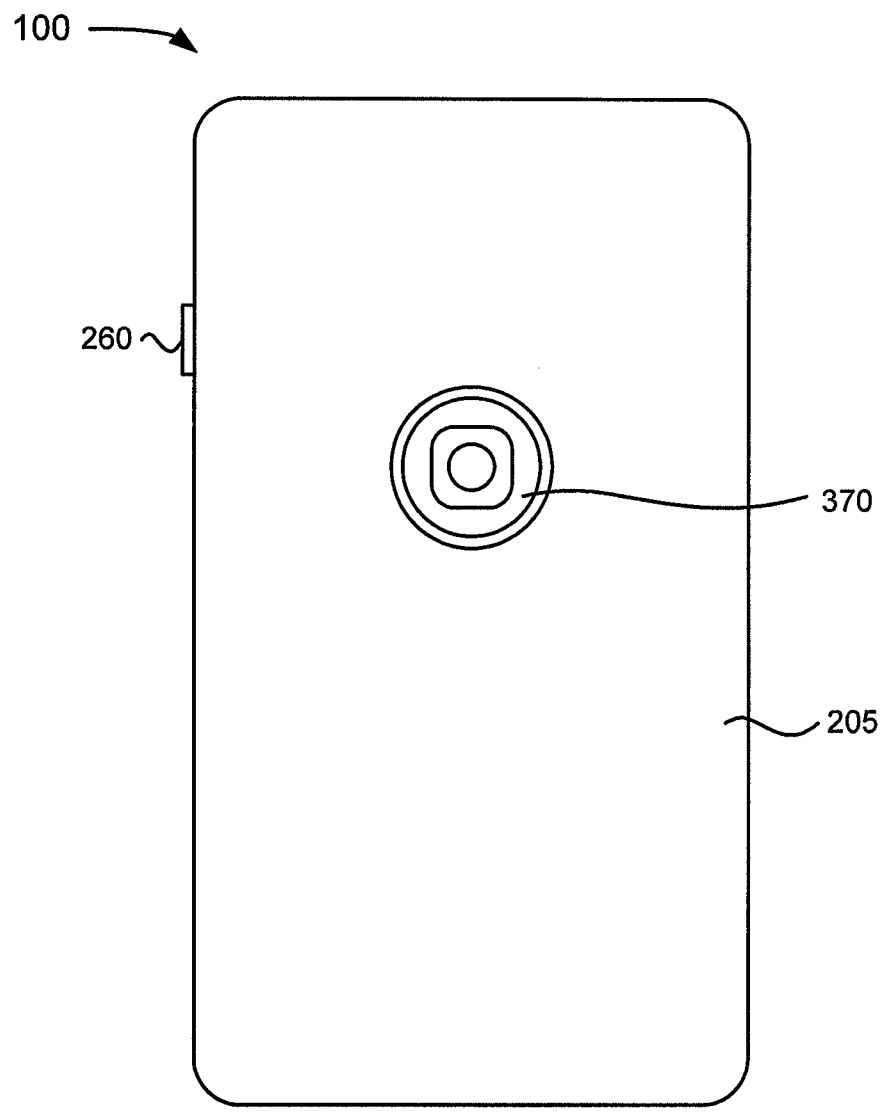
FIG. 3 is a diagram illustrating a rear view of exemplary external components of the portable communication device.

FIG. 3 is a diagram illustrating a rear view of exemplary external components of the device depicted in FIG. 2. As illustrated, in addition to the components previously described, device 100 may include a camera 370.

Camera 370 may include any component capable of capturing an image or a series of images. Camera 370 may be a digital camera. Display 250 may operate as a view finder when a user of device 100 operates camera 370. Camera 370 may provide for automatic and/or manual adjustment of a camera setting. In one implementation, device 100 may include functionality that is displayable on display 250 to allow a user to adjust a camera setting. For example, a user may be able to adjust a setting of camera 370 by operating one or more of function keys 240.

Camera 370 may be used to take a picture, a series of pictures, and/or real-time video that may be used in a video conference. As is described in more detail below, a user of device 100 may, in certain situations, participate in video conferences through device 100 using images or video from a camera external to device 100. Accordingly, in some situations camera 370 is not necessary and may thus not be provided on device 100.

Device 100 is intended to be broadly interpreted to include any type of communication device. For example, device 100 may include a handheld device, such as a wireless telephone, a personal digital assistant (PDA), or a computer. Accordingly, although FIGS. 2 and 3 illustrate exemplary external components of device 100, in other implementations, device 100 may contain fewer, different, or additional external components than the external components depicted in FIG. 1. Additionally, or alternatively, one or more external components of device 100 may include the capabilities of one or more other external components of device 100. For example, display 250 may be an input component (e.g., a touch screen). Additionally, or alternatively, the external components may be arranged differently than the external components depicted in FIG. 1.

Figure 4:
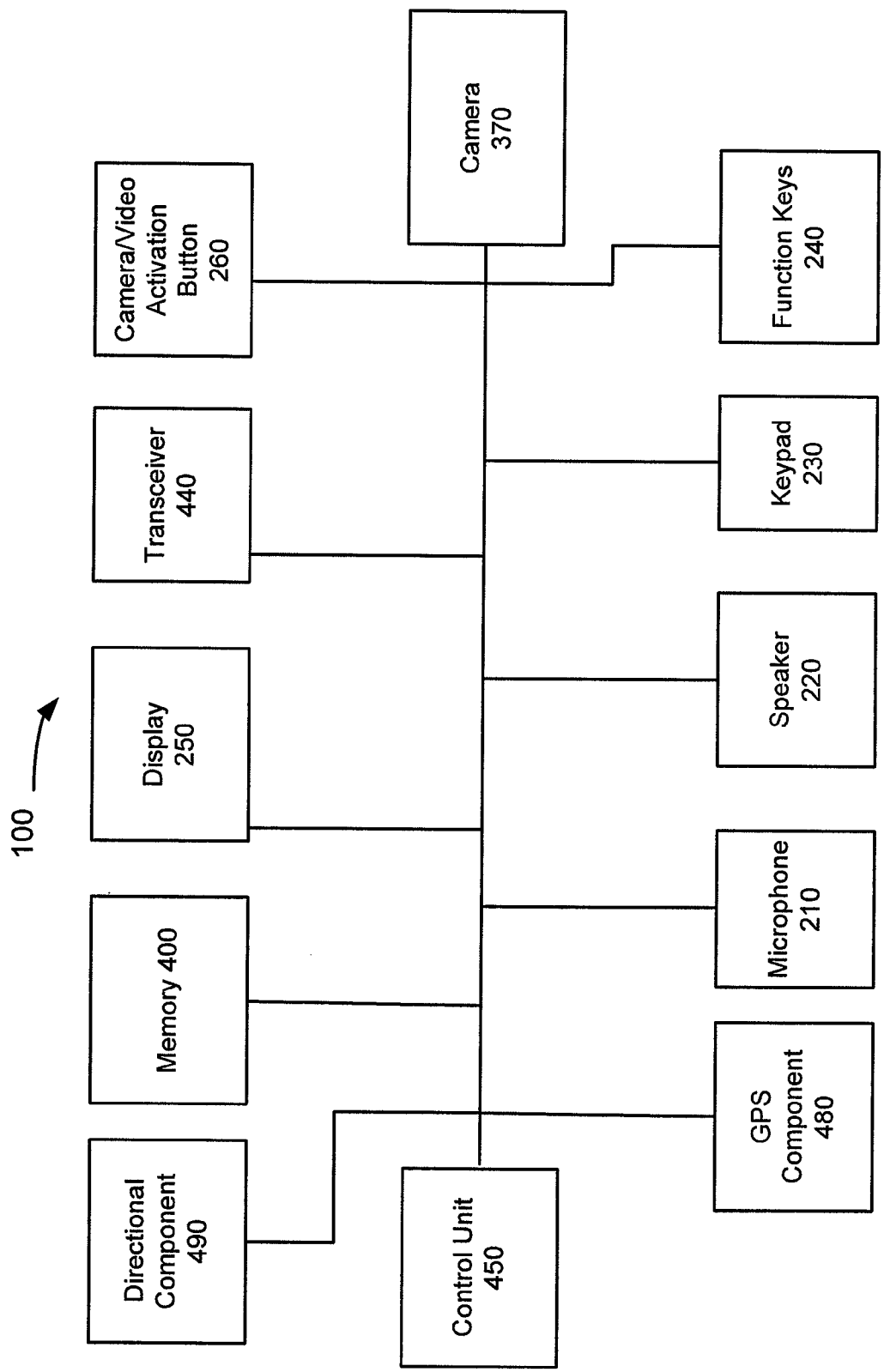
FIG. 4 is a diagram illustrating exemplary internal components of the device shown in FIGS. 2 and 3.

FIG. 4 is a diagram illustrating exemplary internal components of device 100. As illustrated, device 100 may include microphone 210, speaker 220, keypad 230, function keys 240, display 250, camera/video activation button 260, camera 370, a memory 400, a transceiver 440, a control unit 450, a GPS component 480, and a directional component 490. Microphone 210, speaker 220, keypad 230, function keys 240, display 250, camera/video activation button 260, and camera 370 may represent the circuitry or other processing elements associated with the corresponding elements, as shown in FIGS. 2 and 3. Accordingly, no further description of these elements will be provided with respect to FIG. 4.

Memory 400 may include any type of computer-readable medium to store data and instructions related to the operation and use of device 100. For example, memory 400 may include a memory component, such as a random access memory (RAM), dynamic random access memory (DRAM), static random access memory (SRAM), synchronous dynamic random access memory (SRAM), ferroelectric random access memory, (FRAM), a read only memory (ROM), a programmable read only memory (PROM), an erasable programmable read only memory (EPROM), electrically erasable read only memory (EEPROM), and/or flash memory. Additionally, memory 400 may include a storage component, such as a magnetic storage component (e.g., a hard drive), a compact disc (CD) drive, a digital versatile disc (DVD) drive, or another type of computer-readable medium. Memory 400 may also include an external storing component, such as a Universal Serial Bus (USB) memory stick, a digital camera memory card, and/or a Subscriber Identity Module (SIM) card.

Transceiver 440 may include any component capable of transmitting and receiving information. For example, transceiver 440 may include a radio circuit that provides wireless communication with a network or another device.

GPS (Global Positioning System) component 480 may include logic to obtain position information of device 100 using the Global Navigation Satellite System (GNSS). In some implementations, other technologies may alternatively be used to obtain positional information of device 100 instead of GPS component 480. For example, the location of device 100 may be determined through contact with local short range wireless networks or via triangulation with cellular towers.

Device 100 may optionally include directional component 490, which may include, for example, gyroscope, a compass or accelerometer logic that may be used to ascertain the directional orientation of device 100 and potentially of the user holding device 100.

Control unit 450 may include any logic that may interpret and execute instructions, and may control the overall operation of device 100. Logic, as used herein, may include hardware, software, and/or a combination of hardware and software. Control unit 450 may include, for example, a general-purpose processor, a microprocessor, a data processor, a co-processor, application specific integratged circuit (ASIC), field programmable gate array (FPGA), and/or a network processor. Control unit 450 may access instructions from memory 400, from other components of device 100, and/or from a source external to device 100 (e.g., a network or another device).

Control unit 450 may provide for different operational modes associated with device 100. Additionally, control unit 450 may operate in multiple modes simultaneously. For example, control unit 450 may operate in a camera mode, a video conference mode, and/or a telephone mode. The operation of control unit 450 and device 100 in videoconference mode will be particularly described in more detail below.

Although FIGS. 2-4 illustrate exemplary internal and external components, in other implementations, device 100 may include fewer, additional, and/or different components than the exemplary components depicted in FIGS. 2-4. In still other implementations, one or more components of device 100 may include the capabilities of one or more other components of device 100. For example, transceiver 440 and/or control unit 450 may include their own on-board memory 400. Additionally, hardwired circuitry may be used in place of or in combination with software instructions to implement operations of device 100. Thus, implementations described herein are not limited to any specific combination of hardware circuitry and software.

Exemplary Operation

As previously discussed, device 100 may be used to facilitate a video conference. Consistent with aspects described herein, the images for the video conference may be obtained from a camera external to device 100.

A video conference, as this term is used herein, is to be broadly interpreted as communication between two or more parties in which both audio and visual information is transferred. The visual information may be video (i.e., a sequence of images that are updated fast enough to appear to fluidly capture movement) or a series of images in which the images are separated by longer time periods. Further, the visual information for a video conference does not need to be transmitted in both directions. That is, a video conference may be conducted in which only one party receives visual information.

A user of a portable communication device, such as a user of device 100, may wish to establish a video conference with another party. The user may, for example, be speaking to the other party via device 100 and during the course of the conversation, the users may decide that they would like to view images of each other. Alternatively, the user, when initially dialing the called party, may initiate the conversation as a video conference.

Figure 5:
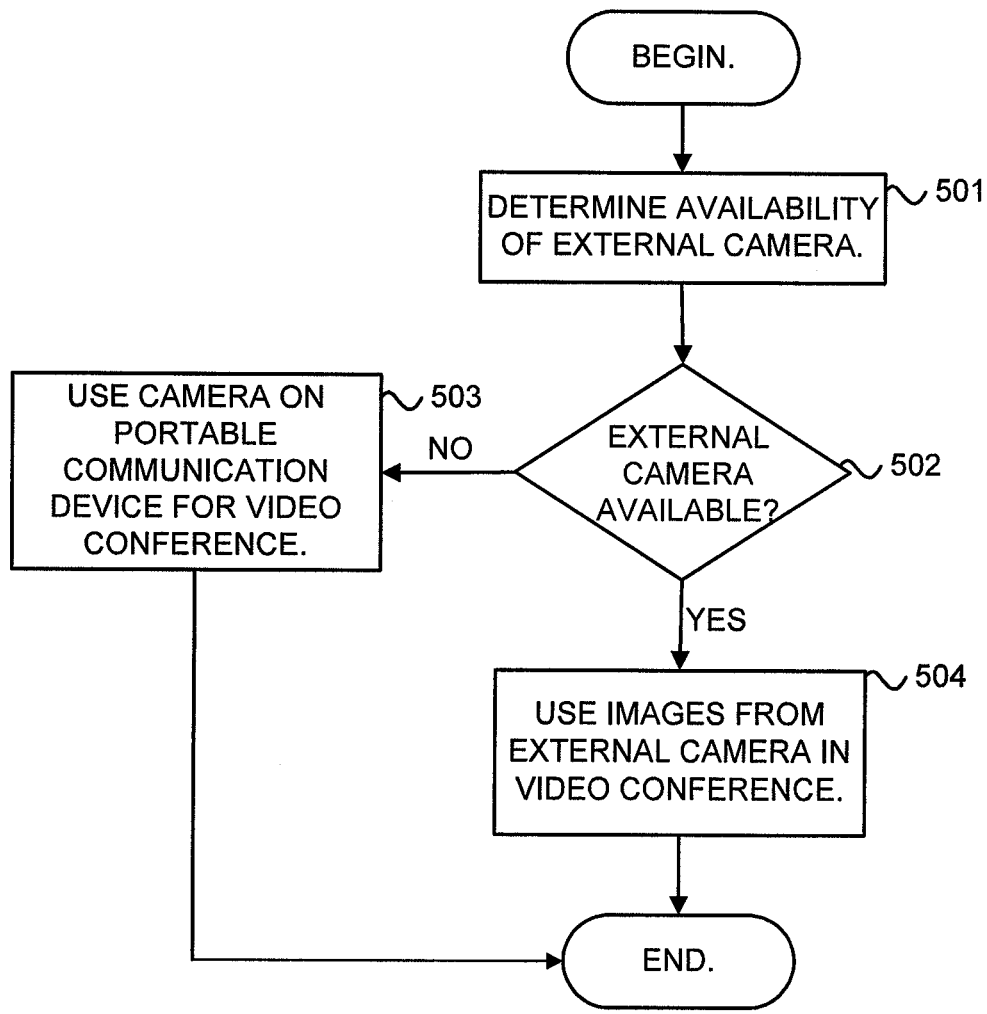
FIG. 5 is a flow chart illustrating exemplary operations for providing a video conference.

FIG. 5 is a flow chart illustrating exemplary operations for providing a video conference.

Initially, it may be determined whether an external camera is available for the video conference (act 501). The external camera may be any camera that is not part of portable communication device 100 and that is focused on the user or is located in the vicinity of device 100. For example, public or private surveillance cameras or security cameras may be used. A number of different possible techniques can be used to determine or to inform the user when the user is in view of or near an external camera. For example, GPS component 480 and/or directional component 490 may be used to locate the user and the location of the user may then be compared to a list of known available external cameras. Alternatively, external cameras may use face recognition technologies to identify people and then proactively "publish" or notify users when they are in focus. These techniques are discussed in more detail below.

If an external camera is not available, the user may use camera 370 on portable communication device 100 to generate video for the video conference (acts 502 and 503). Alternatively, or if device 100 does not have a camera, the user may decide to forgo transmitting video to the other party.

If an external video camera is determined to be available, video from the external video camera may be sent to the other party as part of the video conference (acts 502 and 504). If, for example, an available public surveillance camera is focusing on the user, the other party may view video from the surveillance camera as the video that is included in the video conference. The other party may receive the video in a number of possible ways. For example, portable communication device 100 may receive video from the nearby external camera via a short range wireless signal (e.g., a Bluetooth or WiFi signal), and may then forward the video to the other party over network 110. Alternatively, the other party may receive video directly from the external camera over network 110. In this case, the other party to the video conference may be forwarded a link or address associated with the external camera so that the other party may begin to receive the video from the external camera.

As previously mentioned, the determination of whether an external camera is available for the video conference (act 501) can be performed using a number of possible techniques. In general, a user may, at any particular time, wish to know which, if any, external cameras are viewing or "watching" the user. The user may, through portable communication device 100, request that the device 100 determine which external cameras are watching the user. The results of this request may then be used in initiating a video conference, as shown in FIG. 5. Alternatively, in some implementations, the list of external cameras that are watching the user may simply be shown to the user for amusement or informational purposes.

Various techniques for performing act 501 will now be described in additional detail with reference to FIGS. 6-10.

Figure 6:
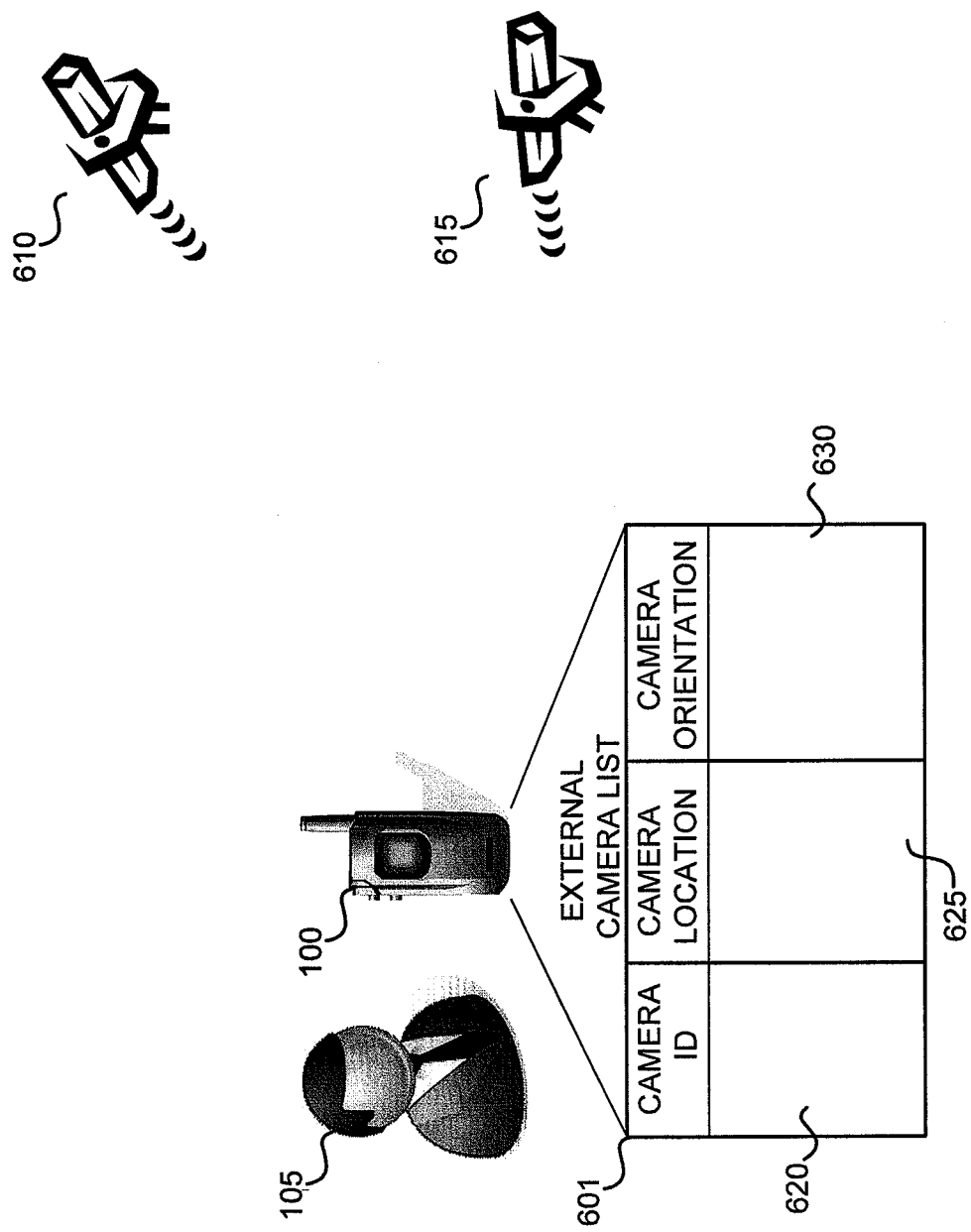
FIG. 6 is a diagram of an exemplary system that conceptually illustrates the determination of external cameras that are watching a user.

FIG. 6 is a diagram of a system 600 that conceptually illustrates the determination of external cameras that are watching the user using information from GPS component 480 and/or a directional component 490. Assume that user 105 would like to use portable communication device 100 to determine whether any external cameras are available and watching the user. In this example, device 100 includes a data structure, labeled as external camera list 601. As shown, system 600 additionally includes external cameras 610 and 615. External cameras 610 and 615 may be, for example, public surveillance or security cameras.

External camera list 601 may be, for example, a list stored in memory 400 of portable communication device 100. External camera list 601 may generally describe the external cameras that are available for possible use as a video source. For example, as shown in FIG. 6, external camera list 601 includes a camera identification (ID) field 620, camera location field 625, and camera orientation field 630. Camera identification field 620 may store a name or identification coded associated with the external cameras 610 and 615, camera location field 625 may store an indication of the location of cameras 610 and 615 (e.g., as an address or a latitude and longitude value), and camera orientation field 630 may store an indication of the orientation of cameras 610 and 615 (e.g., the direction the camera is pointing, whether the camera is panning, etc.).

In an alternative possible implementation, external camera list 601, instead of being stored locally in device 100, may be stored at, for example, a database located externally from device 100 and that may be accessed remotely over network 110.

Public surveillance and security cameras, as discussed above, are becoming increasingly prevalent. The video from at least some of these cameras may be made publicly available. For example, cameras owned by government organizations may be required by law to make the location and video from the cameras available. Alternatively, private companies that own surveillance cameras may, for free or for a fee, make the video taken by the cameras available. In these situations, the location and optionally, the orientation of the video cameras may be published by the entity that operates the camera. This information may form the basis for external camera list 601.

Figure 7:
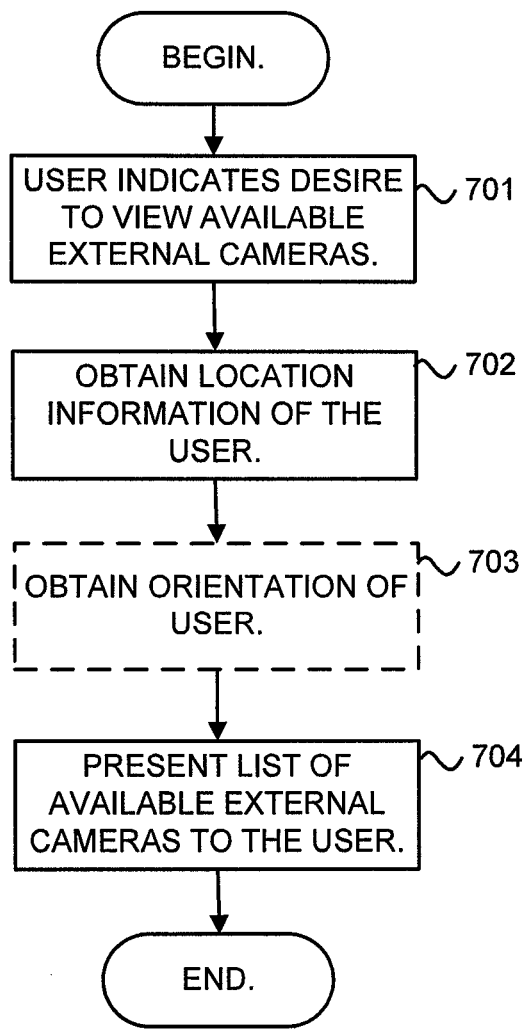
FIG. 7 is a flow chart illustrating exemplary operations for determining which external cameras are watching the user based on the system shown in FIG. 6.

FIG. 7 is a flow chart illustrating exemplary operations for determining which external cameras are watching the user 105 based on the system shown in FIG. 6. The user 105 may indicate that the user 105 would like to view a list of available external cameras (act 701). In response, portable communication device 100 may obtain location information of the user 105 (act 702). The location information may be obtained using GPS location via GPS component 480. Other techniques for obtaining the location of the user 105, such as triangulation using cellular phone towers may alternately be used to obtain the position of the user 105. Portable communication device 100 may optionally obtain the orientation of the device 100 (act 703). The orientation (e.g., the direction the user is facing) may be obtained via directional component 490. To obtain the orientation of the user 105, it may be assumed that the user 105 is carrying or holding portable communication device 100 in a particular orientation when the user 105 requests the list of available external cameras.

Using the position information and possibly the orientation information of the user 105, portable communication device 100 may search external camera list 601 for external cameras that are likely to be focused on the user 105. This list of external cameras may then be displayed or otherwise presented to the user 105 (act 704). In situations in which the user 105 is initiating a video conference, the returned list of video cameras may be used to obtain video for the video conference.

Figure 8:
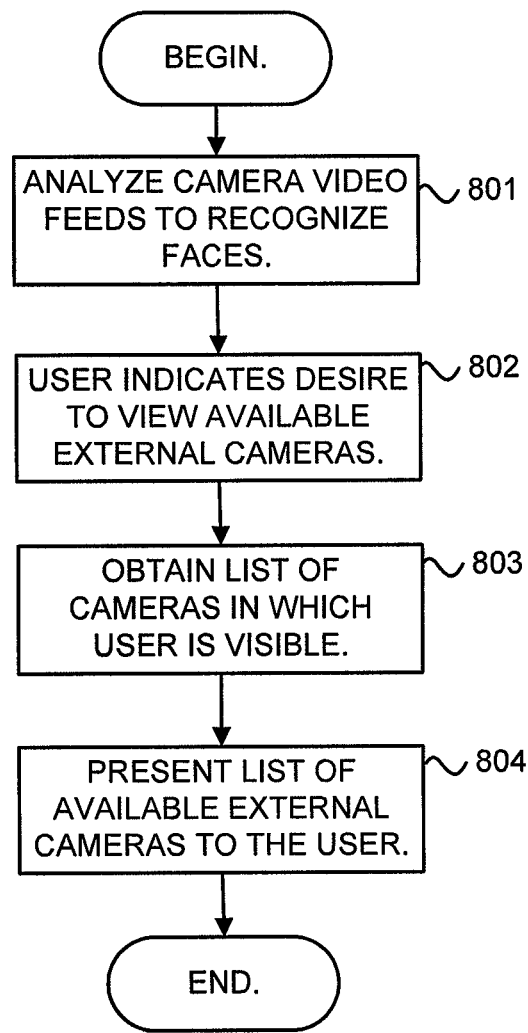
FIG. 8 is a flow chart illustrating exemplary operations for determining which external cameras are watching the user consistent with another implementation.

FIG. 8 is a flow chart illustrating exemplary operations for determining which external cameras are watching the user 105 consistent with another implementation. In general, as described in FIG. 8, automated face recognition techniques may be used to identify when a user is in view of a camera.

Video from a network of external video cameras, such as the cameras operated by a police force in a particular jurisdiction, may be continuously monitored and analyzed to recognize faces in the cameras (act 801). Automated facial recognition techniques are known in the art and will not be described further herein. In one implementation, users that wish to use the service may be required to pre-register images of their face with the operator of the video cameras.

The user 105 may indicate, via portable electronic device 100, that the user 105 would like to view a list of available external cameras (act 802). In response, portable communication device 100 may obtain a list of any cameras in which the user's face is currently (or recently) visible (act 803). This list may be obtained, for example, by querying a database or other server device over network 110. The database or server device may be dynamically updated as users move in and out of a network of available external cameras as their faces are recognized. This list of external cameras that are currently viewing the user 105 may then be displayed or otherwise presented to the user 105 (act 804). In situations in which the user is initiating a video conference, the returned list of video cameras may be used to obtain video for the video conference.

Figure 9:
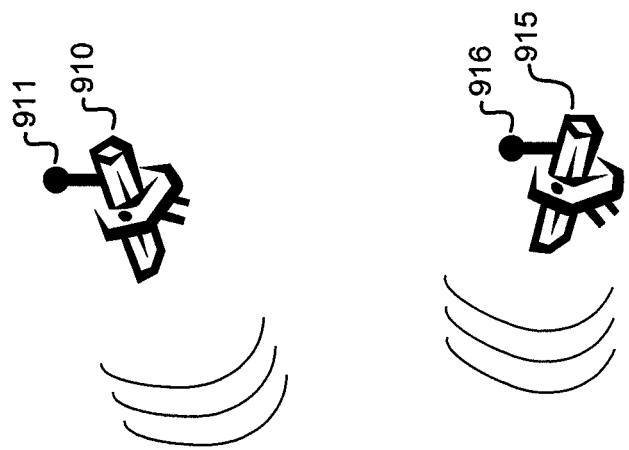
FIG. 9 is a diagram of an exemplary system that conceptually illustrates the determination of external cameras that are in the vicinity of the user based on detection using local wireless signals.
Figure 9:
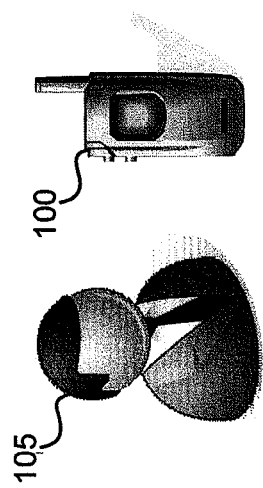
Figure 10:
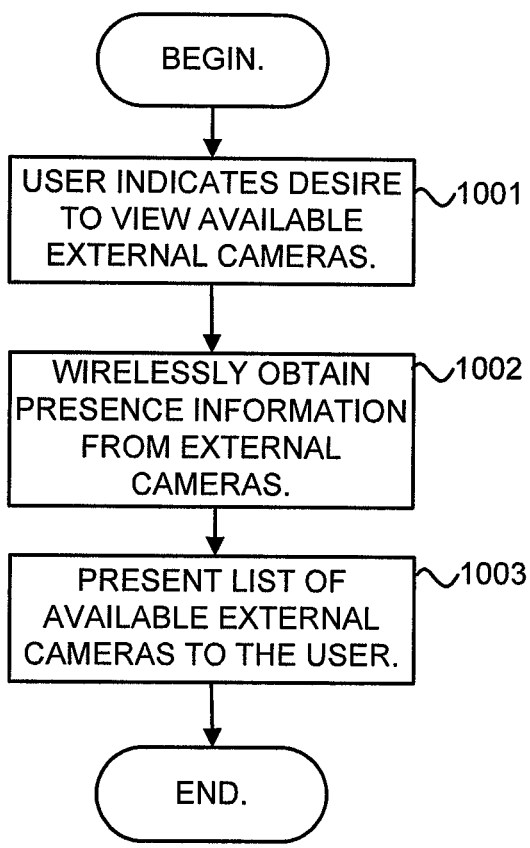
FIG. 10 is a flow chart illustrating exemplary operations for determining which external cameras are watching the user based on the system shown in FIG. 9.

FIGS. 9 and 10 are diagrams illustrating exemplary operations for determining which external cameras are watching the user consistent with another implementation. In general, as described with respect to the description of FIGS. 9 and 10, detection via local wireless signals may be used to identify when a user is near an external camera.

FIG. 9 is a diagram of a system 900 that conceptually illustrates the determination of external cameras that are in the vicinity of the user based on detection using local wireless signals. System 900, as shown, includes external cameras 910 and 915. External cameras 910 and 915 may be, for example, public surveillance or security cameras. External cameras 910 and 915 may include respective wireless transceivers 911 and 916 through which the cameras may communicate with local devices. For example, external cameras 910 and 915 may continuously broadcast, via radio or light signals, information that indicates the presence of the broadcasting camera, called "presence information" herein. In some implementations, wireless transceivers 911 and 916 may be additionally used by external cameras 910 and 915 to receive requests for and transmit video information to device 100.

FIG. 10 is a flow chart illustrating exemplary operations for determining which external cameras are watching the user based on the system shown in FIG. 9. The user may indicate that the user would like to view a list of available external cameras (act 1001). In response, portable communication device 100 may determine if it is currently receiving or has recently received wireless presence information from a local external camera (act 1002). A list of determined external cameras (if any) may then be displayed or otherwise presented to the user (act 1003). In some implementations, in addition to simply displaying whether an external camera is present, device 100 may additionally obtain and display an image or video stream currently or recently taken by the external camera.

Example Initiation of a Video Conference

Initiation of an exemplary video conference using device 100 will now be described. Assume that a user, such as user 105 shown in FIGS. 6 or 9, decides to initiate a video conference with another party. Before dialing the number of the party, the user 105 may first control device 100 to determine whether any external cameras are available. Alternatively, in other implementations, the user 105 may first dial the called party and then, during the course of the call, check to determine whether an external camera is available.

In response to the user's command, device 100 may check whether any external cameras are available. Device 100 may perform this check using one or more of the techniques discussed with respect to FIGS. 7, 8, and 10.

Assume that two external cameras are determined to be available to capture images for a video conference. That is, assume that two external cameras are determined to be in the vicinity of the user 105 and may be used to take videos of the user 105. Device 100 may allow the user 105 to choose which, if any, of these two available cameras to use in the video conference.

Figure 11:
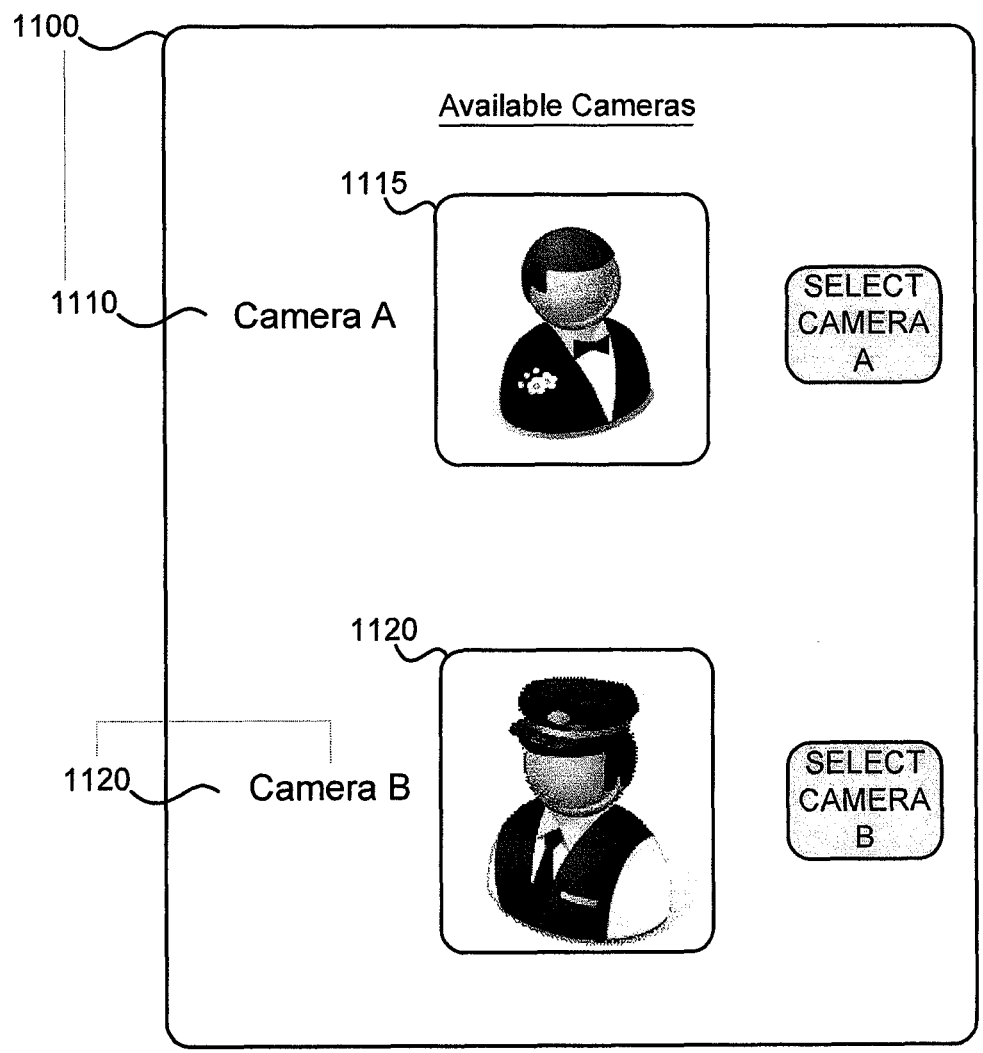
FIG. 11 is an exemplary graphical interface that a device may present to a user.

FIG. 11 is an exemplary graphical interface 1100 that device 100 may present to user 105 in display 250. Interface 1100 allows the user to select an external camera. In interface 1100, labels 1110 and 1120 are shown corresponding to the two available cameras. Additionally, images 1115 and 1120, which may represent current or recently taken images provided by each of the available cameras, are shown in interface 1100. The user may select one of the external cameras to use in the video conference. In an alternative implementation, device 100 may automatically determine which of multiple external cameras are taking the most relevant images of the user and automatically select this external camera. This determination may be based on, for example, the presence or size of the face of the user 105 in the image, whether the camera is focused on user 105, whether the orientation of the camera is appropriate, etc.

During the course of the video conference, audio spoken by the user 105 and received by microphone 210 may be transmitted over network 110 to the called party. Video from the selected camera may also be transmitted to the called party. In one implementation, the video may be transmitted directly to the called party (i.e., without first being transmitted through device 100) and the audio from user 105 may be transmitted as a separate stream to the called party from user 105. In another implementation, the video may be first sent to device 100, such as via a short range local wireless network, and then forwarded, with the audio of the user, to the called party.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while series of processes have been described herein, the order of the processes may be modified in other implementations. Further, non-dependent processes may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method for conducting a video conference, the method comprising:
    obtaining a location of a portable communication device;
    determining, by the portable communication device and based on the location, whether at least one video camera external to the portable communication device is in a vicinity of the portable communication device;
    using video taken by the at least one video camera in a video conference conducted via the portable communication device, wherein the video taken by the at least one video camera displays a user of the portable communication device inputting audio into the portable communication device; and
    using audio input into the portable communication device for the video conference,
    wherein obtaining the location of the portable communication device comprises obtaining the location using a GPS signal.

2. The method of claim 1, further comprising:
    presenting a list of video cameras that are determined to be in the vicinity of the portable communication device.

3. The method of claim 1, wherein the determining step includes:
    determining video cameras in the vicinity of the portable communication device based on face recognition techniques used to recognize a user of the portable communication device in video taken by the video cameras.

4. The method of claim 1, wherein the determining step includes: determining video cameras in the vicinity of the portable communication device based on presence information that is wirelessly transmitted by the video cameras.

5. The method of claim 1, wherein the video cameras external to the portable communication device include public surveillance cameras.

6. The method of claim 1, wherein using the video taken by the at least one video camera in a video conference further includes:
    receiving the video from the at least one video camera at the portable communication device; and
    transmitting the received video to a party with whom the video conference is to be conducted.

7. The method of claim 1, wherein using the video taken by the at least one video camera in a video conference further includes:
    causing the video from the at least one video camera to be transmitted to a party with whom the video conference is to be conducted.

8. A method for conducting a video conference, the method comprising:
    receiving, at a portable communication device, a request for identification of video cameras that are external to the portable communication device;
    identifying, by the portable communication device, video cameras that are external to the portable communication device and that are in a vicinity of the portable communication device;
    presenting, via a visual display on the portable communication device, the identified video cameras; and
    using the portable communication device, conducting a video conference using video associated with at least one of the identified video cameras and audio input into the portable communication device, wherein a user of the portable communication device is viewable in the video.

9. The method of claim 8, wherein the identifying step includes:
    obtaining a location of the portable communication device; and
    determining the video cameras in the vicinity of the portable communication device based on the location.

10. The method of claim 8, wherein the identifying includes:
    determining the video cameras in the vicinity of the portable communication device based on face recognition techniques used to recognize the user of the portable communication device in video taken by the video cameras.

11. The method of claim 8, wherein the identifying step includes:
    determining the video cameras in the vicinity of the portable communication device based on presence information that is wirelessly transmitted by the video cameras.

12. The method of claim 1, wherein the determining step further comprises:
    determining an orientation of the portable communication device; and
    determining, based on the orientation of the portable communication device, whether the at least one video camera external to the portable communication device is in the vicinity of the portable communication device.

13. The method of claim 8, further comprising:
    presenting a graphical interface configured to facilitate selection of one of the identified video cameras for use in the video conference.

14. A portable communication device, comprising:
    a memory to store instructions; and
    a processor to execute the instructions to:
    obtain a location of the portable communication device;
    determine, based on the location, video cameras external to the portable communication device that are in a vicinity of the portable communication device; and
    enable a video conference in which video taken by at least one of the determined video cameras is used as a video source for the video conference and in which audio input into the portable communication device is used as an audio source for the video conference, wherein a user of the portable communication device is viewable in the video.

15. The portable communication device of claim 14, further comprising: a display, and wherein the processor further executes instructions to present a list of the video cameras determined to be in the vicinity of the portable communication device.

16. The portable communication device of claim 14, wherein the processor further executes instructions to obtain the location of the portable communication device using a GPS signal.

17. The portable communication device of claim 14, wherein the processor further executes instructions to determine the video cameras in the vicinity of the portable communication device based on face recognition techniques used to recognize the user of the portable communication device in video taken by the video cameras.

18. The portable communication device of claim 14, wherein the processor further executes instructions to determine the video cameras in the vicinity of the portable communication device based on presence information that is wirelessly transmitted by the video cameras.

19. The portable communication device of claim 14, wherein the video cameras external to the portable communication device include public surveillance cameras.

20. A method for conducting a video conference, the method comprising:
    determining at least one video camera in a vicinity of a portable communication device based on at least one of presence information that is wirelessly transmitted by the at least one video camera, a face recognition technique to recognize a user of the portable communication device in video taken by the at least one video camera, or a location of the portable communication device;
    using video taken by the at least one video camera in a video conference conducted via the portable communication device; and
    using audio input into the portable communication device for the video conference,
    wherein the video captured by the at least one video camera displays the user of the portable communication device.

21. The method of claim 20, further comprising:
    determining an orientation of the portable communication device; and
    determining, based on the orientation of the portable communication device, whether the at least one video camera external to the portable communication device is in the vicinity of the portable communication device.

22. A method for conducting a video conference, the method comprising:
    determining a location and an orientation of a portable communication device; and
    determining, based on the location and the orientation of the portable communication device, whether at least one video camera external to the portable communication device is in a vicinity of the portable communication device;
    using video taken by the at least one video camera in a video conference conducted via the portable communication device; and
    using audio input into the portable communication device for the video conference.

23. The method of claim 22, wherein the video captured by the at least one video camera displays a user of the portable communication device.

* * * * *